United States Patent
Krasner et al.

(10) Patent No.: US 12,461,658 B2
(45) Date of Patent: Nov. 4, 2025

(54) OFFLOADING MACHINE LEARNING CAPABILITIES

(71) Applicant: Dell Products L.P., Round Rock, TX (US)

(72) Inventors: Jonathan I. Krasner, Coventry, RI (US); Malak Alshawabkeh, Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 18/487,595

(22) Filed: Oct. 16, 2023

(65) Prior Publication Data
US 2025/0123754 A1    Apr. 17, 2025

(51) Int. Cl.
*G06F 3/06*      (2006.01)
(52) U.S. Cl.
CPC .......... *G06F 3/0617* (2013.01); *G06F 3/0608* (2013.01); *G06F 3/0631* (2013.01); *G06F 3/0689* (2013.01)
(58) Field of Classification Search
CPC .... G06F 3/0617; G06F 3/0631; G06F 3/0608; G06F 3/0689
See application file for complete search history.

(56) References Cited

U.S. PATENT DOCUMENTS

| | | | |
|---|---|---|---|
| 8,478,731 B1 * | 7/2013 | Throop | G06F 16/1744 |
| | | | 707/693 |
| 9,703,664 B1 * | 7/2017 | Alshawabkeh | G06F 3/067 |
| 2014/0195542 A1 * | 7/2014 | Larson | G06F 16/2228 |
| | | | 707/741 |
| 2015/0212974 A1 * | 7/2015 | Wood, III | G06F 17/18 |
| | | | 703/2 |
| 2021/0141535 A1 * | 5/2021 | R. | H03M 7/6058 |
| 2023/0216762 A1 * | 7/2023 | Shamdani | H04L 43/0811 |
| | | | 709/224 |

* cited by examiner

*Primary Examiner* — Jane W Benner
(74) *Attorney, Agent, or Firm* — Amin, Turocy & Watson, LLP

(57) ABSTRACT

A system can maintain a group of data processing units and a storage array that comprises a group of sub-logical unit numbers of storage. The system can collect, by a central processing unit, first data indicative of input and output events for the storage array. The system can process, by respective data processing units, respective autoregressive integrated moving average models for respective sub-logical unit numbers of the group of sub-logical unit numbers with the first data, to generate respective statuses that indicate respective frequencies of access of the respective sub-logical unit numbers. The system can determine, by the central processing unit, respective classifications for respective sub-logical unit numbers of the group of sub-logical unit numbers of storage based on the respective statuses. The system can compress, by a compression engine, second data stored in at least some of the respective sub-logical unit numbers based on the respective classifications.

20 Claims, 11 Drawing Sheets

OFFLOADING MACHINE LEARNING CAPABILITIES

BACKGROUND

Computer systems can store computer data. This data can be compressed.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a group of data processing units. The system can maintain a storage array that comprises a group of sub-logical unit numbers of storage. The system can collect, by a central processing unit, first data indicative of input events for the storage array and output events for the storage array. The system can process, by respective data processing units of the group of data processing units, respective autoregressive integrated moving average models for respective sub-logical unit numbers of the group of sub-logical unit numbers with the first data, to generate respective statuses that indicate respective frequencies of access of the respective sub-logical unit numbers. The system can determine, by the central processing unit, respective classifications for respective sub-logical unit numbers of the group of sub-logical unit numbers of storage based on the respective statuses. The system can compress, by a compression engine, second data stored in at least some of the respective sub-logical unit numbers based on the respective classifications.

An example method can comprise collecting, by a processor of a system, first data indicative of input and output events for a storage array. The method can further comprise processing, by respective data processing units of the system, respective autoregressive integrated moving average models for respective sub-logical unit numbers the storage array with the first data, to generate respective temperature scores that indicate respective frequencies of access of the respective sub-logical unit numbers. The method can further comprise determining, by the processor, respective classifications for the respective sub-logical unit numbers based on the respective temperature scores. The method can further comprise compressing, by the system, second data stored in at least some of the respective sub-logical unit numbers based on the respective classifications.

An example non-transitory computer-readable medium can comprise instructions that, in response to execution, cause a system comprising a processor to perform operations. These operations can comprise processing, by respective data processing units of the system, respective autoregressive integrated moving average models for respective sub-logical unit numbers of a storage array with first data, to generate respective temperature scores that indicate respective frequencies of access of the respective sub-logical unit numbers, wherein the first data is indicative of input/output events for the storage array. These operations can further comprise determining, by the processor, respective classifications for the respective sub-logical unit numbers based on the respective temperature scores. These operations can further comprise compressing, by the system, second data stored in at least some of the respective sub-logical unit numbers based on the respective classifications.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
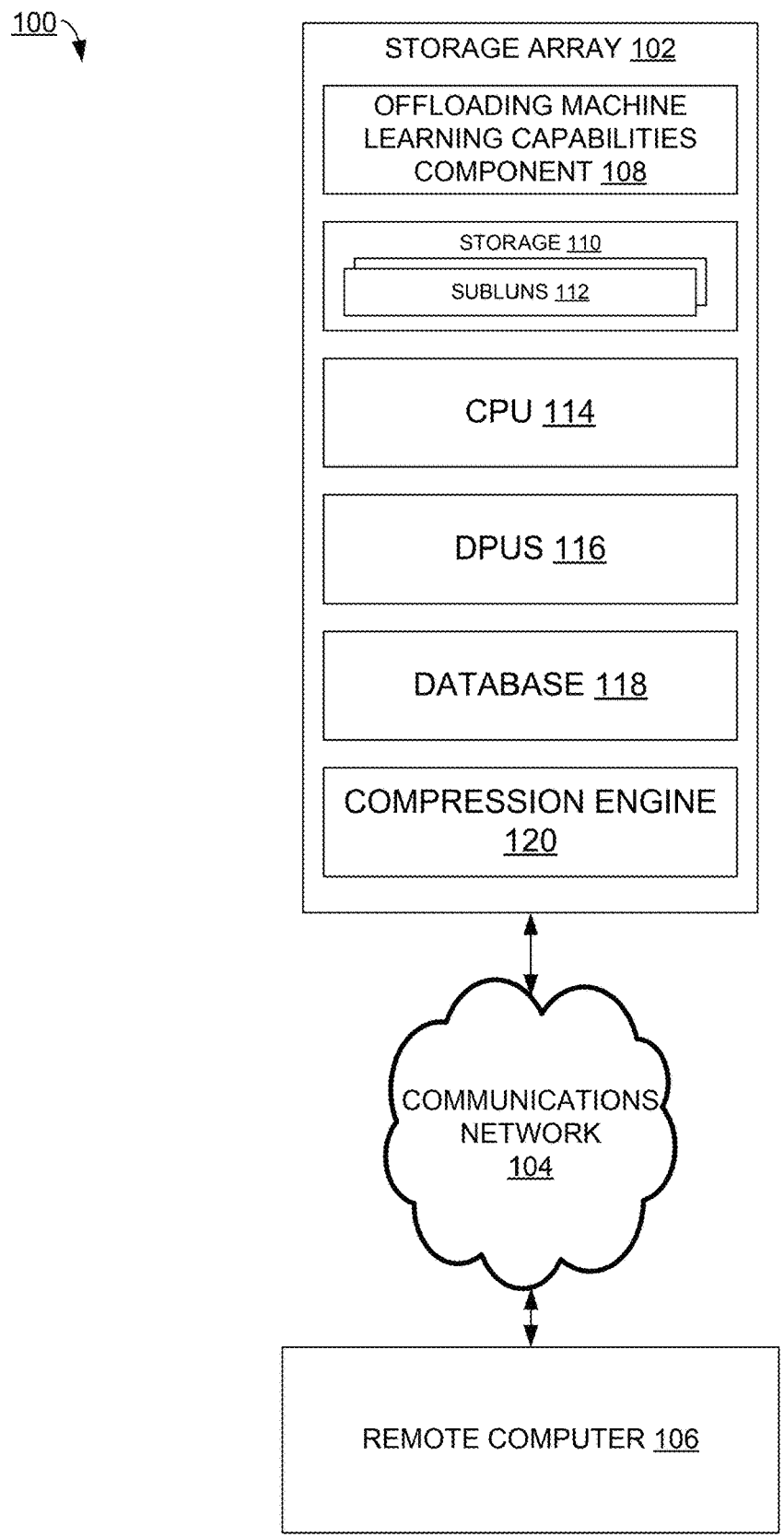
FIG. 1 illustrates an example system architecture that can facilitate offloading machine learning capabilities, in accordance with an embodiment of this disclosure.

Some computer storage systems can effectuate storage efficiency with inline data compression. However, there can be a problem associated with constant compression and decompression of data that is accessed frequently, because that can be impactful to system response time, and thus to end users.

In some system architectures, processing (e.g., central processing unit (CPU)) resources can be consumed to perform a live workload input/output (I/O) temperature forecasting that can be involved with autonomously optimizing system configurations for data reduction. A machine learning (ML) model can be embedded in a storage array to detect hot data stored in subluns, which can facilitate busiest allocations to skip compression, so can lead to improved performance.

Subluns (which can be referred to as SUBLUNs), can generally identify a sub-part of a storage device that is addressed using a logical unit number.

In implementing a ML model in this manner, it can be desired to minimize (or otherwise lower) use of CPU and memory resources so as not to negatively impact system performance. Minimizing resource usage can reduce an amount, scale, and/or complexity of how quickly a forecasting approach can detect active/hot subluns.

In some examples, when a compute node is busy, it can be that this forecasting cannot be completed, which can result in a skipped cycle (which can be 11 minutes, in some examples), thus negatively impacting data reduction decisions of which allocations to compress or decompress. An advantage of the present techniques can relate to leveraging an inclusion of data processing units (DPUs) over CPUs for these tasks, which can allow for faster and more-deterministic outcomes for hot data sets that should or should not be compressed. The present techniques can be effectuated through the use of auto regressive integrated moving average (ARIMA) techniques with DPUs, where it can be that a similar approach is not viable with CPUs only.

It can be desirable for storage infrastructure to accommodate a mixed workload environment, deliver high IO operations per second (IOPS), deliver low latency, provide expandable capacity, and boost overall system efficiency. In some examples, it can be that there are no additional CPU cycles available to add more criteria to these determinations (for example, time-series forecasting), and there is an upper limit that can be reached when under heavy I/O workloads on a given computer node. It can be that prior approaches do not provide for offload resources available in a storage array to utilize.

According to the present techniques, forecasting can be used to predict future I/O activity. The present techniques can be implemented to facilitate using ARIMA techniques utilizing an improved time series approach relative to prior approaches, and which can leverage DPUs (which can extend an ingest of data sets that can be processed within a given timeframe). In a case of DPUs versus CPUs, a data ingest can be exponential and takes the burden off CPUs. ARMIA can involve a computational complexity modeling schema O(mn2T), where m is the number of extents, n is the number of parameters (that is, n=p+q+P+Q+ . . . ), and T is the length of the time series of interest.

In a context of using DPUs, these parameters can scale exponentially, yet completion time can remain near constant while scaling, making an ARIMA model according to the present techniques extremely scalable and versatile by which more data can be processed without degradation to I/O performance of a workload and/or the total time to complete multiple "kernel" threads handed off to a DPU. This in turn, can improve forecasting accuracy, with greater efficiency relative to using CPUs.

Forecasting can be used to predict future I/O activity that an extent will experience. A classification technique based on skew distribution can be applied to determine a threshold for hot/cold.

The present techniques can be implemented to facilitate applying ARMIA models for timeseries forecasting using DPUs that process a large size of data (e.g., an address space of 250 MB).

In some examples, applying the present techniques can be performed as follows. For each sublun in a storage array for which the present techniques are applied, a CPU can collect I/O events, downsample them to create a data series, and then offload the data series to a DPU (where multiple DPUs can be engaged for processing multiple subluns). A DPU can create an ARIMA process that constructs a corresponding ARIMA model, trains it using the data series, fit the model to find values of p, d, and q, and then generate a temperature score for the sublun. The DPU can send the temperature score back to the CPU.

The CPU can construct a skew distribution using all temperature scores, and based on a threshold value, the CPU can generate a classification (e.g., HOT or COLD) for each sublun, and store that classification into a database that is accessible to a compression engine.

When a host-write I/O accesses a track in a sublun's address range, if the sublun is marked HOT (using that example) in the database then a compression engine can skip compression for that sublun, and otherwise the compression engine can compress the sublun.

Example Architectures, Etc

FIG. 1 illustrates an example system architecture 100 that can facilitate offloading machine learning capabilities, in accordance with an embodiment of this disclosure.

System architecture 100 comprises storage array 102, communications network 104, and remote computer 106. In turn, storage array 102 comprises offloading machine learning capabilities component 108 (where, in some examples, processing an ARIMA model can be a form of machine learning), storage 110 (which comprises subluns 112), central processing unit (CPU) 114, data processing units (DPUs) 116, database 118, and compression engine 120.

Figure 11:
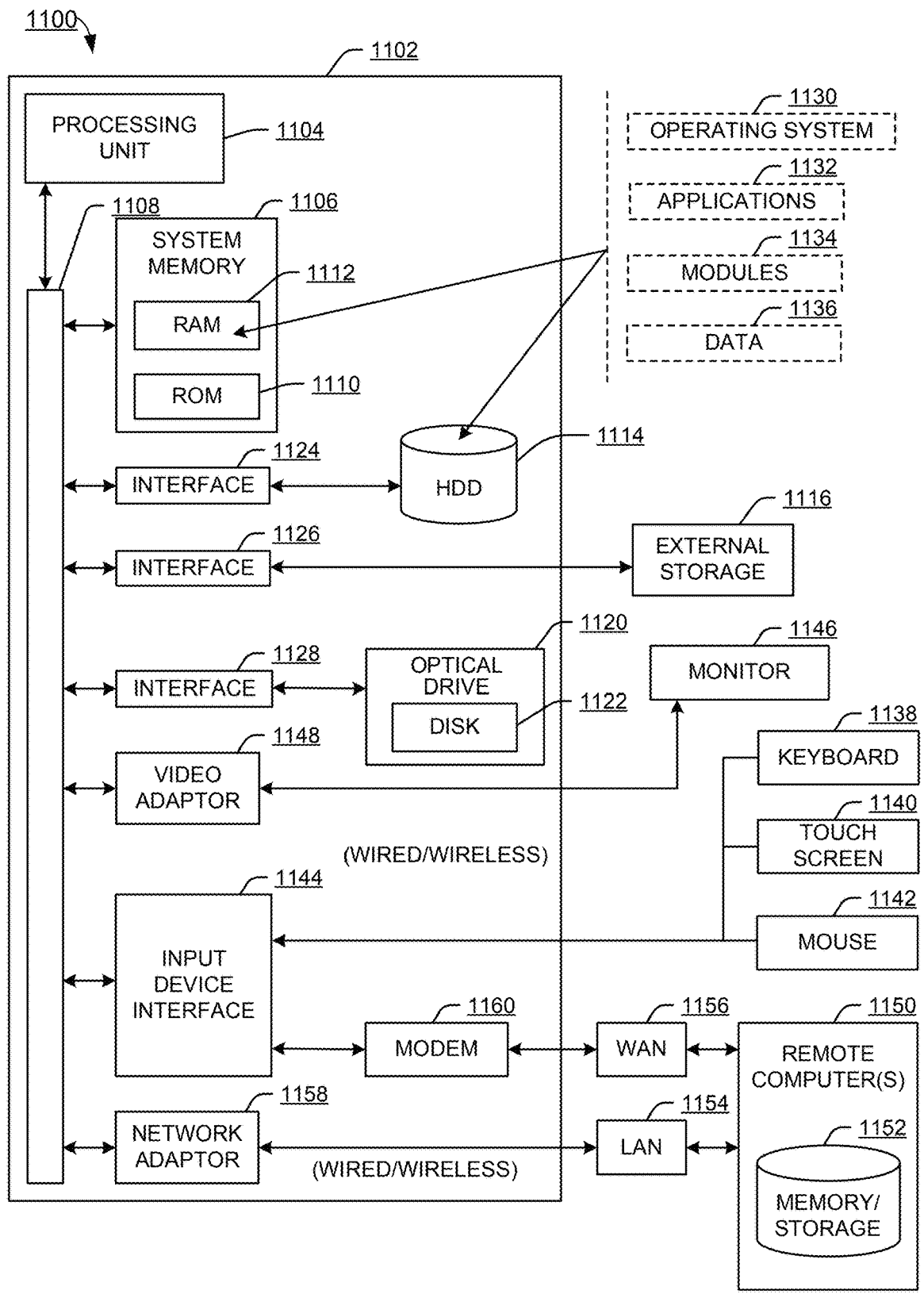
FIG. 11 illustrates an example block diagram of a computer operable to execute an embodiment of this disclosure.

Each of storage array 102 and/or remote computer 106 can be implemented with part(s) of computing environment 1100 of FIG. 11. Communications network 104 can comprise a computer communications network, such as the Internet.

CPU 114 can generally comprise a general-purpose microprocessor that is configured to control storage array 102. Each DPU of DPUs 116 can generally comprise its own CPU (along with a network interface card). In storage array 102, CPU 114 can control DPUs 116, such as by offloading processing tasks to DPUs 116.

Storage array 102 can generally comprise multiple computer storage devices that are centrally managed. Storage array 102 can store and provide access to computer data that is stored in storage 110 (where storage 110 is logically divided into subluns 112), such as by servicing data read and write requests received from remote computer 106 via communications network 104. As part of this, storage array 102 can conserve storage resources by compressing infrequently-accessed data of storage 110.

To determine which subluns of subluns 112 to compress, offloading machine learning capabilities component 108 (in conjunction with CPU 114) can create ARIMA models for each sublun, and instruct DPUs 116 to process these models with timeseries data that indicates past accesses of the respective subluns, to produce a forecast of future accesses of the respective subluns. Where the forecast is for infrequent access of a particular sublun (e.g., that sublun's temperature score is considered cold), that sublun can be compressed (by compression engine 120). Where the forecast is for frequent access of a particular sublun (e.g., that sublun's temperature score is considered hot), that sublun can be determined not to be compressed.

Information about a temperature score can be stored in database 118, and used by compression engine 120 to determine which subluns to compress. In some examples, temperature scores are determined by DPUs 116, and CPU 114 posts that temperature score data to database 118.

Figure 8:
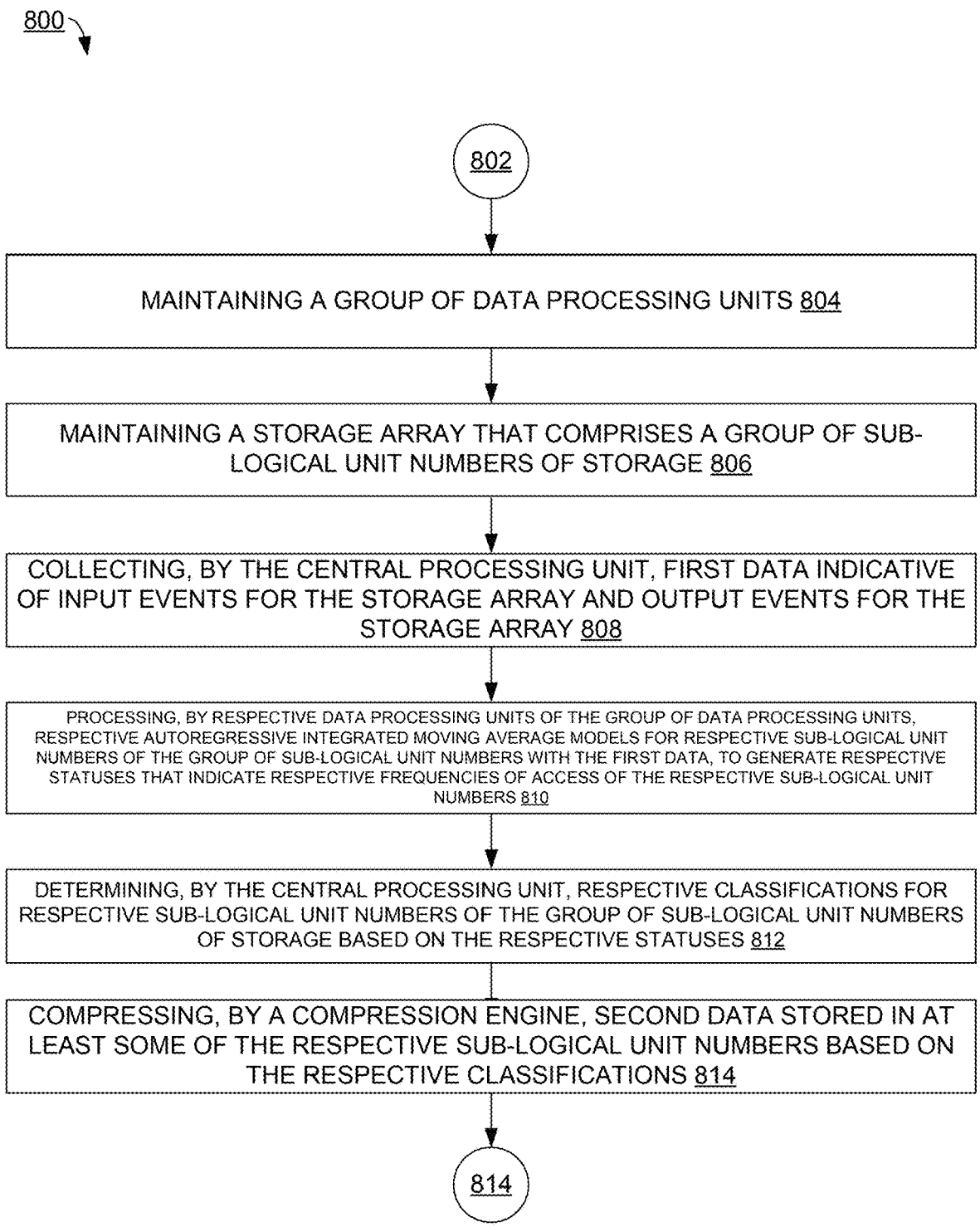
FIG. 8 illustrates an example process flow that can facilitate offloading machine learning capabilities, in accordance with an embodiment of this disclosure.
Figure 9:
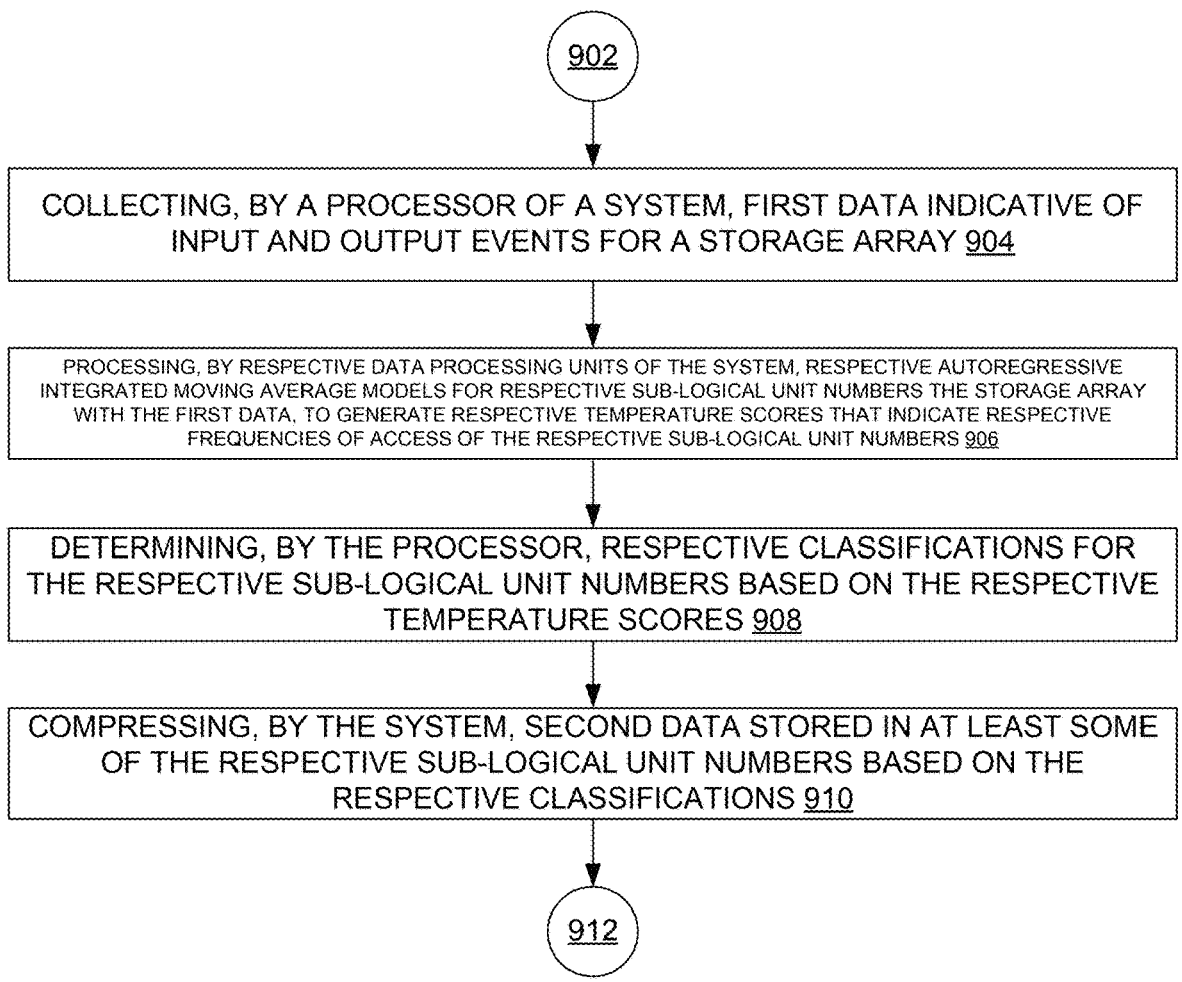
FIG. 9 illustrates another example process flow that can facilitate offloading machine learning capabilities, in accordance with an embodiment of this disclosure.
Figure 10:
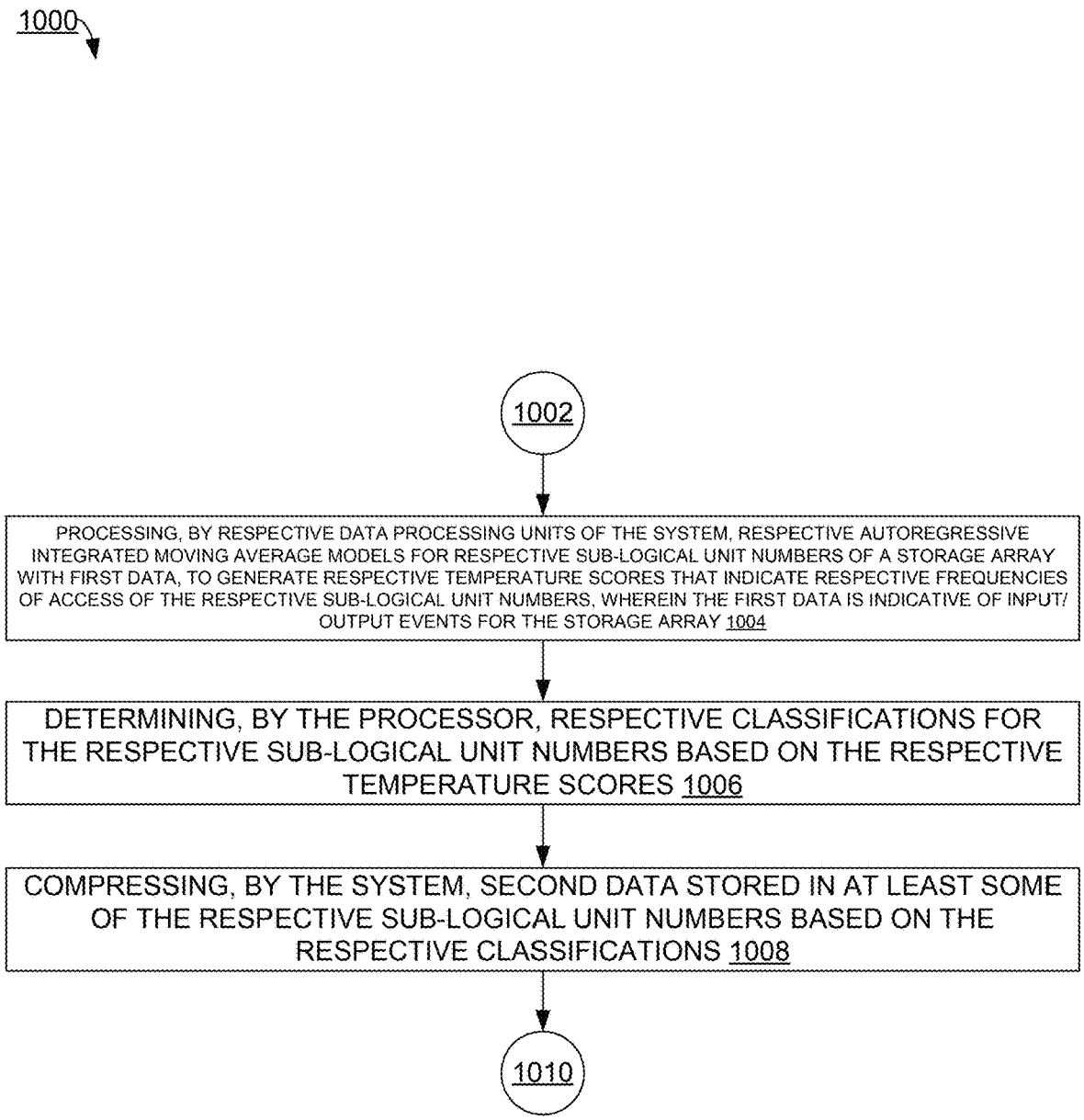
FIG. 10 illustrates another example process flow that can facilitate offloading machine learning capabilities, in accordance with an embodiment of this disclosure.

In some examples, offloading machine learning capabilities component 108 can implement part(s) of the process flows of FIGS. 8-10 to implement offloading machine learning capabilities.

It can be appreciated that system architecture 100 is one example system architecture for offloading machine learning capabilities, and that there can be other system architectures that facilitate offloading machine learning capabilities.

Figure 2:
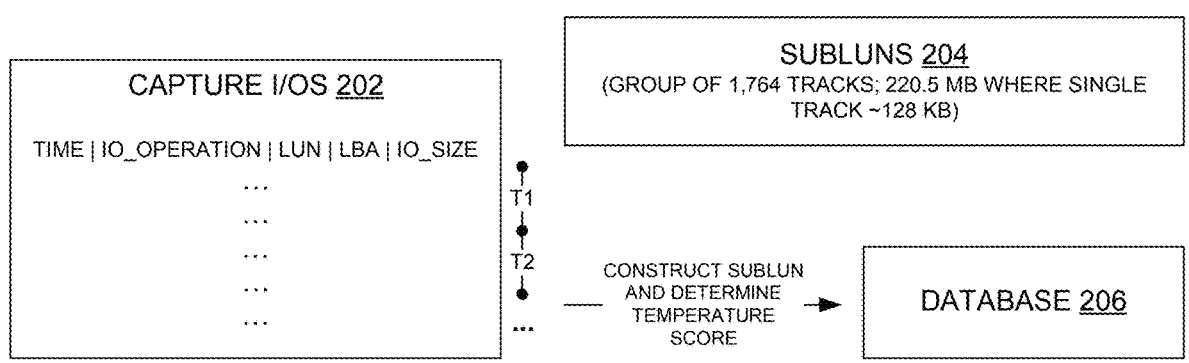
FIG. 2 illustrates an example system architecture for determining a temperature score for a sublun, and that can facilitate offloading machine learning capabilities, in accordance with an embodiment of this disclosure.

FIG. 2 illustrates an example system architecture for determining a temperature score for a sublun, and that can facilitate offloading machine learning capabilities, in accordance with an embodiment of this disclosure. In some examples, part(s) of system architecture 200 can be used to implement part(s) of system architecture 100 of FIG. 1 to facilitate offloading machine learning capabilities.

System architecture 200 comprises capture I/Os 202, subluns 204, database 206, and offloading machine learning capabilities component 208 (which can be similar to offloading machine learning capabilities component 108 of FIG. 1).

In an example, the present techniques can be implemented to capture streaming I/O events (via capture I/Os 202), and down sample them to construct subluns (e.g., subluns 204), where each sublun can contain 1,764 tracks (for a total size of approximately 220 megabytes (MB)). This approach can provide a finer granularity (relative to prior approaches) of an address space in which system resources can be managed. In some examples, for each sublun, a time series record is created, for which a "temperature score" is determined and stored in a database (e.g., database 206).

In some examples, capture I/Os 202 can comprise a series of entries on I/O operations, where an entry identifies a time at which the operation occurred (in "time"), a type of the operation such as write (in "I/O operation"), a LUN accessed by the operation (in "LUN"), a logical block address (LBA) associated with the operation (in "LBA"), and an amount of data accessed in the operation (in "I/O size"). In some examples, capture I/Os 202 can be used to create an I/O profile time-series, which can be a data set that tracks a sample over time (e.g., a rate of read or write operations). This can facilitate determining what factors influence a certain I/O profile from period to period, and whether there is a pattern that repeats between cycles.

Figure 3:
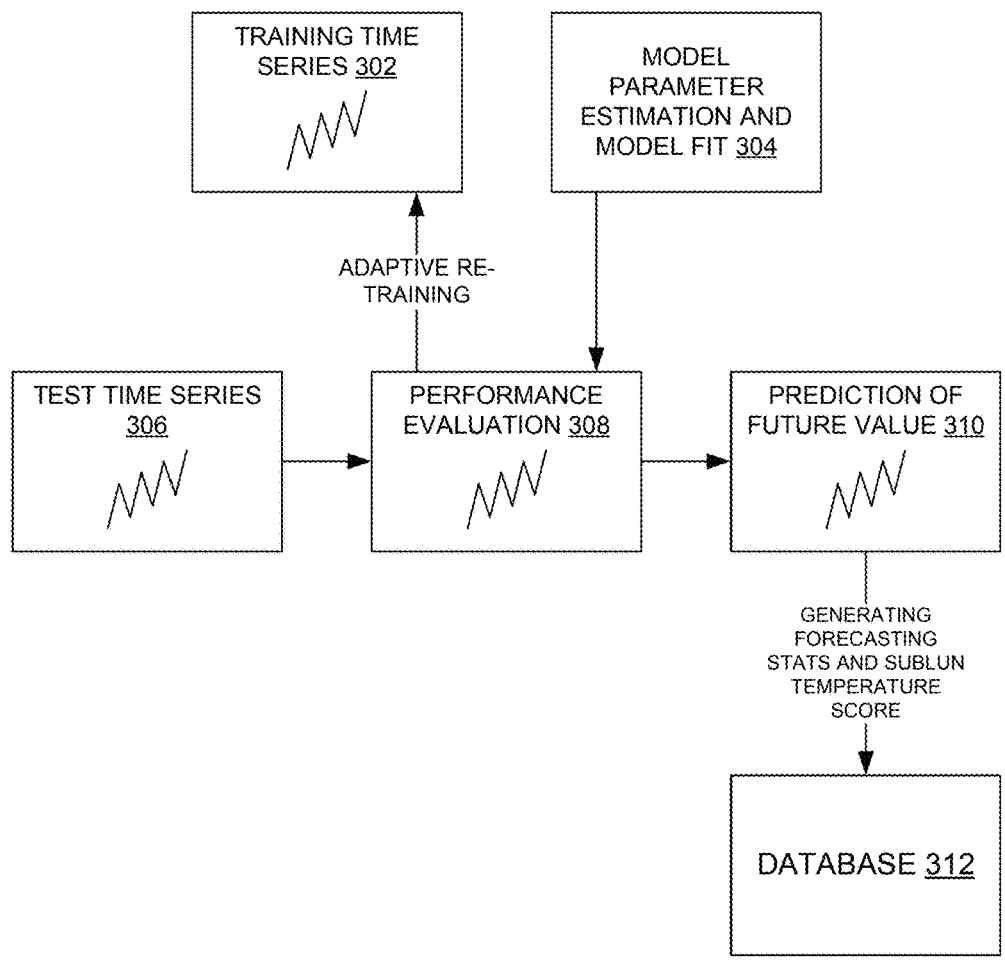
FIG. 3 illustrates example system architecture for forecasting a temperature score for a sublun, and that can facilitate offloading machine learning capabilities, in accordance with an embodiment of this disclosure.

FIG. 3 illustrates example system architecture for forecasting a temperature score for a sublun, and that can facilitate offloading machine learning capabilities, in accordance with an embodiment of this disclosure. In some examples, part(s) of system architecture 300 can be used to implement part(s) of system architecture 100 of FIG. 1 to facilitate offloading machine learning capabilities.

System architecture 300 comprises training time series 302, model parameter estimation and model fit 304, test time series 306, performance evaluation 308, prediction of future value 310, database 312, and offloading machine learning capabilities component 314 (which can be similar to offloading machine learning capabilities component 108 of FIG. 1).

To produce a forecast according to the present techniques, time series forecasting according to an ARIMA technique can be used. An ARIMA technique can be based on a concept that information in past values of a time series (e.g., the time series' own lags and the lagged forecast errors) can alone be used to predict future values, as in the following formula:

$$Y_t = \alpha + \beta_1 Y_{t-1} + \beta_2 Y_{t-2} + \ldots + \beta_p Y_{t-p} + \epsilon_t + \varphi_1 \epsilon_{t-1} + \varphi_2 \epsilon_{t-2} + \ldots + \varphi_q \epsilon_{t-q}$$

It can be that an ARIMA (p,d,q) model is characterized by three terms: p, d, q where, p is an order of an auto regressive (AR) term, q is an order of a moving average (MA) term, and d is an order of differencing required to make the time series.

For each sublun, an ARIMA model can be built to predict a future load activity, which can be used to derive a "temperature score" to determine the hotness level of the sublun. It can be that each ARIMA model has its own p, d, and q values, as described herein.

Figure 4:
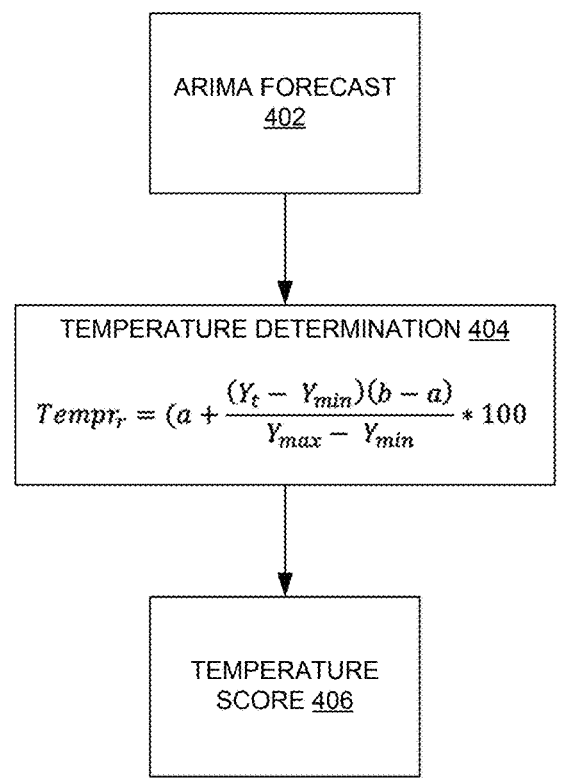
FIG. 4 illustrates another example system architecture for determining a temperature score for a sublun, and that can facilitate offloading machine learning capabilities, in accordance with an embodiment of this disclosure.

FIG. 4 illustrates another example system architecture for determining a temperature score for a sublun, and that can facilitate offloading machine learning capabilities, in accordance with an embodiment of this disclosure. In some examples, part(s) of system architecture 400 can be used to implement part(s) of system architecture 100 of FIG. 1 to facilitate offloading machine learning capabilities.

System architecture 400 comprises ARIMA forecast 402, temperature determination 404, and temperature score 406.

An ARIMA forecast such as described with respect to FIG. 3 can be input as ARIMA forecast 402 and received by temperature determination 404. Temperature determination 404 can perform the following determination:

$$Tempr_r = (a + \frac{(Y_t - Y_{min})(b - a)}{Y_{max} - Y_{min}}) * 100$$

Where a and b are constants, and $Y_{min}$ and $Y_{max}$ are the minimum and maximum ARIMA values determined among all the models, respectively. Temperature determination 404 can produce an output of a (normalized) temperature score for a given sublun, which is depicted as temperature score 406. Temperature score 406 can be used to determine whether or not to compress the corresponding sublun.

Figure 5:
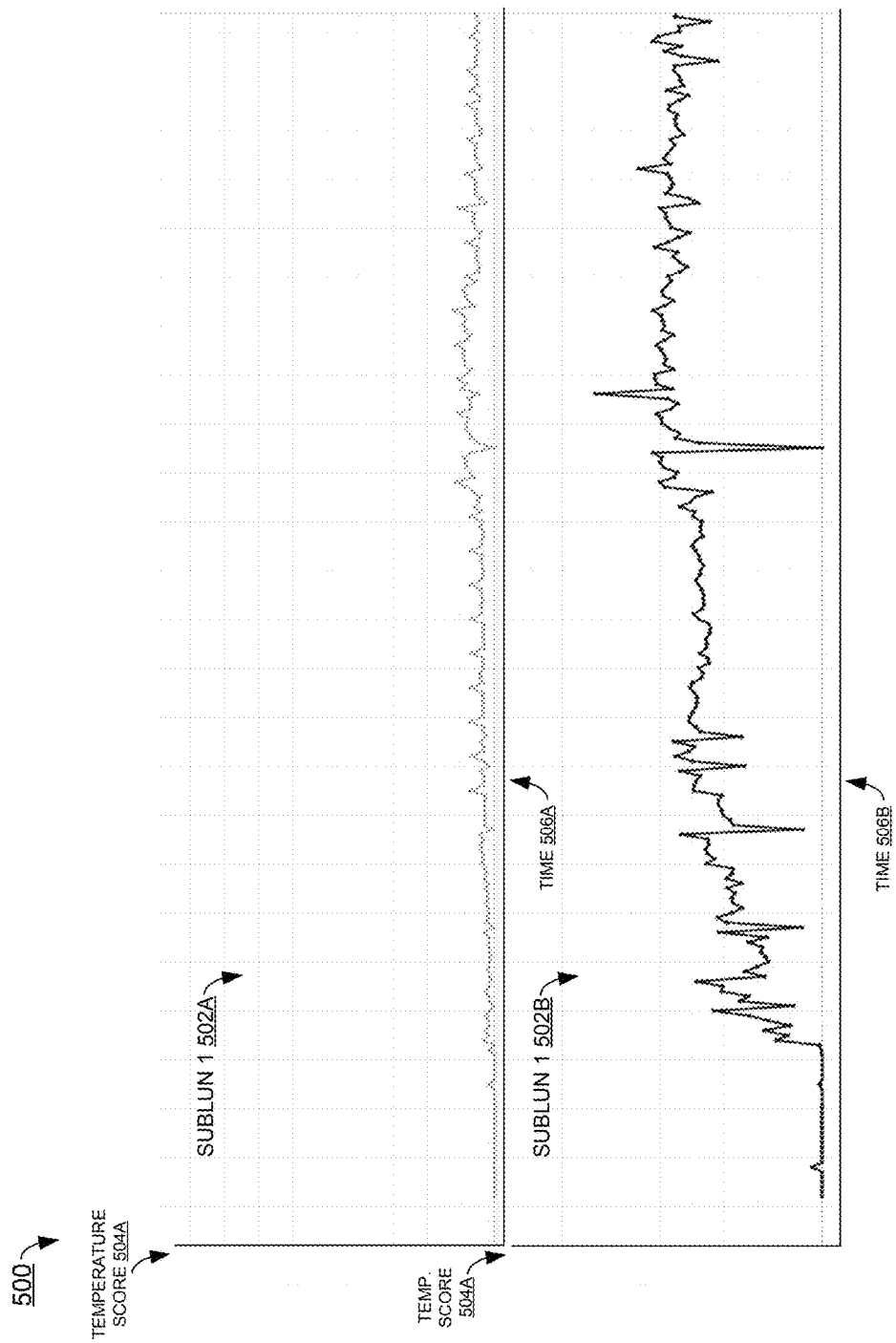
FIG. 5 illustrates an example temperature score forecast for subluns, and that can facilitate offloading machine learning capabilities, in accordance with an embodiment of this disclosure.

FIG. 5 illustrates an example temperature score forecast 500 for subluns, and that can facilitate offloading machine learning capabilities, in accordance with an embodiment of this disclosure. In some examples, part(s) of temperature score forecast 500 can be used to implement part(s) of system architecture 100 of FIG. 1 to facilitate offloading machine learning capabilities.

Temperature score forecast 500 comprises sublun 502A and sublun 502B. For sublun 502A, there is a plot of temperature score 504A over time 506A. Likewise, for sublun 502B, there is a plot of temperature score 504B over time 506B.

As depicted in FIG. 5, a separate forecast can be made for each sublun (e.g., sublun 502A and sublun 502B). This forecast can predict a temperature score (such as described with respect to FIG. 4) for various points in time in the future.

Figure 6:
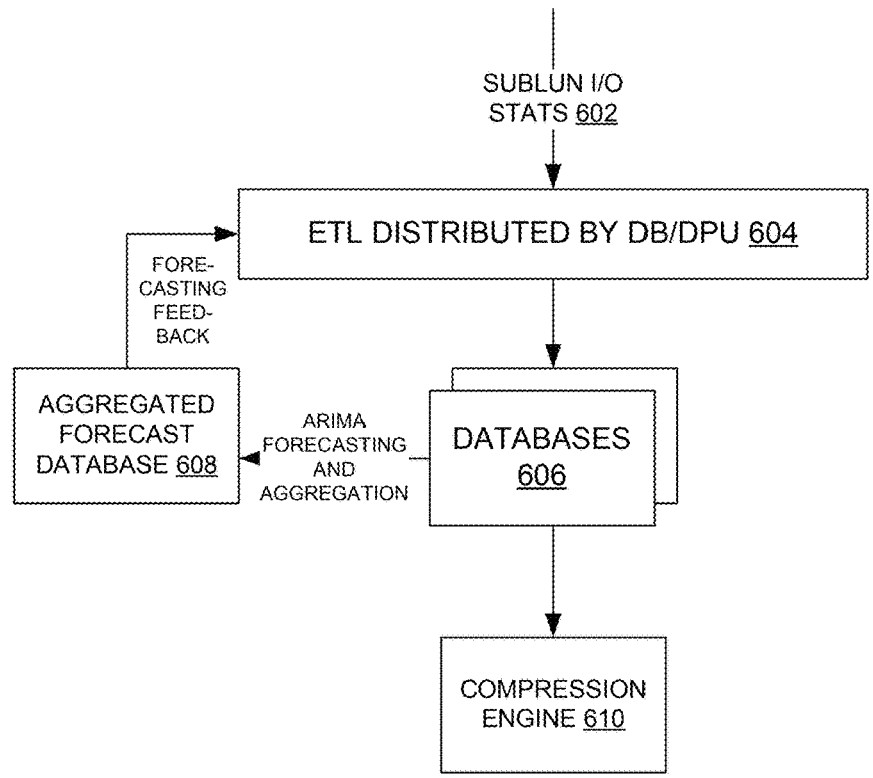
FIG. 6 illustrates another example system architecture that can facilitate offloading machine learning capabilities, in accordance with an embodiment of this disclosure.

FIG. 6 illustrates another example system architecture 600 that can facilitate offloading machine learning capabilities, in accordance with an embodiment of this disclosure. In some examples, part(s) of system architecture 600 can be used to implement part(s) of system architecture 100 of FIG. 1 to facilitate offloading machine learning capabilities.

System architecture 600 comprises sublun I/O statistics 602, extract/transform/load (ETL) distributed by DB/DPU 604, databases 606, aggregated forecast database 608, and compression engine 610.

System architecture 600 can be implemented leverage real-time telemetry and machine learning to optimize storage array resources. A distributed analytics platform can be created based on a database, in conjunction with an embedded ETL component, using a distributed database cluster where a number of database files scales with system capacity. In real time, different system statistics can be continuously captured. These statistics can be analyzed and used to dynamically make decisions based on system state, like optimizing data reduction.

The present techniques can be implemented to boost efficiency and improve performance. An ARIMA model can have a memory, so an autoregressive process can stay high for a while, then stay low for a while, and so on, thereby generating a cyclic pattern of ups and downs about a long-term mean value. A differencing component can be computationally demanding, and so if deployed, it can starve the processing power used in autonomous infrastructure to run essential tasks. An accelerated implementation with DPUs can speed up the differencing determination by taking advantage of a DPUs processing cores and fast I/O memory.

In some examples, when a classification (e.g., hot or cold) of a sublun is ready, the compression engine can be notified. For a hot sublun, a distribute active control can be used to capture I/O statistics with minimal impact, and scale across multiple DPUs, controllers, and other logical and physical components. For hot sublun, statistics can be stored, such as 40,000,000 samples for an array at a 200 terabyte (TB) capacity.

Figure 7:
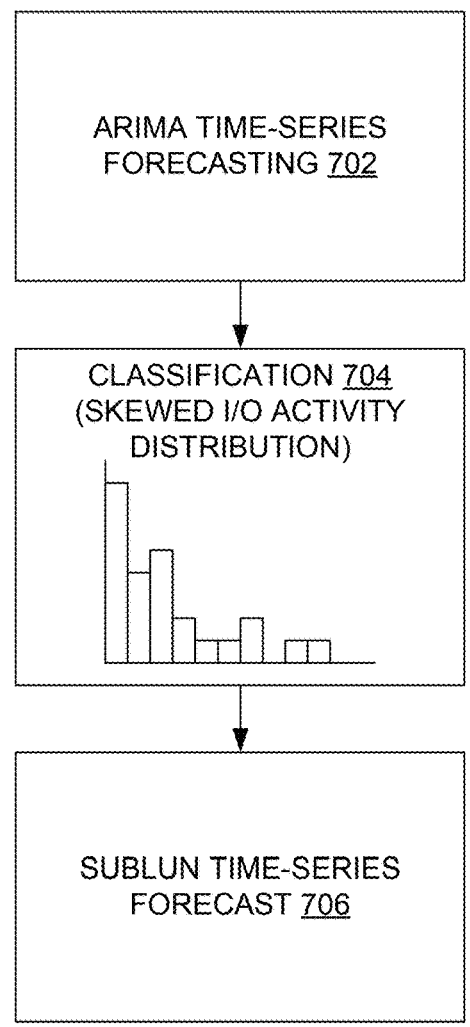
FIG. 7 illustrates another example system architecture that can facilitate offloading machine learning capabilities, in accordance with an embodiment of this disclosure.

FIG. 7 illustrates another example system architecture 700 that can facilitate offloading machine learning capabilities, in accordance with an embodiment of this disclosure. In some examples, part(s) of system architecture 700 can be used to implement part(s) of system architecture 100 of FIG. 1 to facilitate offloading machine learning capabilities.

System architecture 700 comprises ARIMA time-series forecasting 702, classification 704, and sublun time series forecast 706.

ARIMA time-series forecasting 702 can comprise a similar architecture as depicted with respect to FIG. 3. Sublun time series forecast 706 can be similar to temperature score forecast 500 of FIG. 5. Classification 704 can take ARIMA time-series forecasting 702 as input and generate a skewed I/O activity distribution that is used to determine a threshold dividing point between cold data (that will be compressed) and hot data (that will not be compressed). This information in classification 704 can be used to generate sublun time series forecast 706.

A skewed I/O activity distribution can be based on a histogram of sublun temperature scores, and a threshold can be determined based on the histogram. This can be repeated periodically (e.g., every 4 hours) to dynamically adjust the threshold should a workload change.

Example Process Flows

FIG. 8 illustrates an example process flow 800 that can facilitate offloading machine learning capabilities, in accordance with an embodiment of this disclosure. In some examples, one or more embodiments of process flow 800 can be implemented by offloading machine learning capabilities component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804.

Operation 804 depicts maintaining a group of data processing units. Using the example of FIG. 1, the group of data processing units can be DPUs 116, and they can be maintained by storage array 102 so as to make them available for processing data.

After operation 804, process flow 800 moves to operation 806.

Operation 806 depicts maintaining a storage array that comprises a group of sub-logical unit numbers of storage. Using the example of FIG. 1, the storage array can be storage 110, the group of sub-logical unit numbers of storage can be subluns 112, and they can be maintained by storage array 102 so as to make them available for storing data.

In some examples, a sub-logical unit number of the group of sub-logical unit numbers identifies a sub-portion of data storage of a physical storage device, where the physical storage device can be similar to storage 110, and a sublun can identify, for example, approximately a 220 MB portion of a storage device of storage 110.

In some examples, operation 808 comprises downsampling, by the central processing unit, the input events for the storage array and the output events for the storage array to produce downsampled input events and downsampled output events, and wherein the processing of the respective autoregressive integrated moving average models is performed based on the downsampled input events and the downsampled output events. That is, a CPU can collect I/O events, downsample them to create a data series, and then offload the downsampled data series to DPUs.

After operation 806, process flow 800 moves to operation 808.

Operation 808 depicts collecting, by the central processing unit, first data indicative of input events for the storage array and output events for the storage array. Using the example of FIG. 1, the central processing unit can be CPU 114, and it can receive input events for the storage array and output events for the storage array (e.g., streaming I/O events) for storage 110. These streaming I/O events can comprise writing data (input events) to storage 110, and reading data (output events) from storage 110.

After operation 808, process flow 800 moves to operation 810.

Operation 810 depicts processing, by respective data processing units of the group of data processing units, respective autoregressive integrated moving average models for respective sub-logical unit numbers of the group of sub-logical unit numbers with the first data, to generate respective statuses that indicate respective frequencies of access of the respective sub-logical unit numbers. The statuses can be similar to temperature scores, as described herein, and operation 810 can be performed in a similar manner as generating a temperature score is described with respect to FIGS. 2 and 4.

In some examples, the central processing unit is a first central processing unit, and the respective data processing units comprise respective second central processing units, respective network interfaces, and respective accelerator engines that are configured to facilitate processing an autoregressive integrated moving average model. That is, in some examples, a data processing unit can be distinguished from a CPU.

In some examples, an autoregressive integrated moving average model of the respective autoregressive integrated moving average models is configured to determine a prediction of a future rate of data accesses for a sub-logical unit number of the group of sub-logical unit numbers based on time-series data of prior accesses of the sub-logical unit number.

After operation 810, process flow 800 moves to operation 812.

Operation 812 depicts determining, by the central processing unit, respective classifications for respective sub-logical unit numbers of the group of sub-logical unit numbers of storage based on the respective statuses. This can be performed in a similar manner as described with respect to FIG. 7.

After operation 812, process flow 800 moves to operation 814.

Operation 814 depicts compressing, by a compression engine, second data stored in at least some of the respective sub-logical unit numbers based on the respective classifications. Using the example of FIG. 1, the compression engine can be compression engine 120. When a host-write I/O accesses a track in a particular sublun address range, compression engine 120 can skip compressing the sublun if the sublun is marked hot, and otherwise compression engine 120 can compress the sublun, In some examples, operation 814 comprises, in response to performing a first write operation on a first sub-logical unit number of the respective sub-logical unit numbers, in response to a first classification of the respective classifications that corresponds to the first sub-logical unit number indicating compressing data, compressing data stored in the first sub-logical unit number, and in response to a first classification of the respective classifications that corresponds to the first sub-logical unit number indicating not compressing data, refraining from compressing the data stored in the first sub-logical unit number. That is, it can be that when host-write I/O accesses a track in a particular sublun address range, if the sublun is marked hot then compression is skipped, and otherwise it is compressed.

In some examples, operations 812-814 comprise, after determining the respective classifications, storing the respective classifications in a data store to produce stored respective classifications, and where the compression engine compresses the second data stored in at least some of the respective sub-logical unit numbers based on the stored respective classifications. That is, for each sublun, a time-series record can be created, from which a temperature score can be created and stored in a database that is accessible by the compression engine.

After operation 814, process flow 800 moves to 816, where process flow 800 ends.

FIG. 9 illustrates an example process flow 900 that can facilitate offloading machine learning capabilities, in accordance with an embodiment of this disclosure. In some examples, one or more embodiments of process flow 900 can be implemented by offloading machine learning capabilities component 108 of FIG. 1, or computing environment 900 of FIG. 9.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904.

Operation 904 depicts collecting, by a processor of a system, first data indicative of input and output events for a storage array. In some examples, operation 904 can be implemented in a similar manner as operation 808 of FIG. 8.

After operation 904, process flow 900 moves to operation 906.

Operation 906 depicts processing, by respective data processing units of the system, respective autoregressive integrated moving average models for respective sub-logical unit numbers the storage array with the first data, to generate respective temperature scores that indicate respective frequencies of access of the respective sub-logical unit numbers. In some examples, operation 906 can be implemented in a similar manner as operation 810 of FIG. 8.

After operation 906, process flow 900 moves to operation 908.

Operation 908 depicts determining, by the processor, respective classifications for the respective sub-logical unit numbers based on the respective temperature scores. In some examples, operation 908 can be implemented in a similar manner as operation 812 of FIG. 8.

In some examples, operation 908 comprises generating, by the processor, a skew distribution of the respective temperature scores, and determining the respective classifications is performed based on the skew distribution. That is, it can be that a CPU constructs a skew distribution using the subluns' temperature scores, and, based on a threshold value, generates a classification (e.g., HOT or COLD) per sublun, which is stored in a database.

In some examples, the respective classifications comprise respective binary values (e.g., a binary value of HOT or COLD).

In some examples, operation 908 comprises normalizing, by the system, the respective temperature scores to produce respective normalized temperature scores, and where determining the respective classifications is performed based on the respective normalized temperature scores. That is, a temperature score can be derived and normalized based on a forecast to determine a level of hotness.

In some examples, normalizing the respective temperature scores is performed based on a maximum value of the respective temperature scores and a minimum value of the respective temperature scores. This can be implemented in a similar manner as described with respect to FIG. 4.

After operation 908, process flow 900 moves to operation 910.

Operation 910 depicts compressing, by the system, second data stored in at least some of the respective sub-logical unit numbers based on the respective classifications. In some examples, operation 910 can be implemented in a similar manner as operation 812 of FIG. 8.

In some examples, the compressing is performed by a compression engine that is separate from the processor and the respective data processing units. This compression engine can be similar to compression engine 120 of FIG. 1.

In some examples, operations 908-910 comprise, after the respective data processing units determine the respective statuses, storing the respective statuses in a database to produce stored respective statuses, and where compressing the second data stored in at least some of the respective sub-logical unit numbers is performed based on the stored respective statuses. That is, for each sublun, a timeseries record can be created, from which a temperature score can be created and stored in a database that is accessible by a component that performs compression.

After operation 910, process flow 900 moves to 912, where process flow 900 ends.

FIG. 10 illustrates an example process flow 1000 that can facilitate offloading machine learning capabilities, in accordance with an embodiment of this disclosure. In some examples, one or more embodiments of process flow 1000 can be implemented by offloading machine learning capabilities component 108 of FIG. 1, or computing environment 1000 of FIG. 10.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, and/or process flow 900 of FIG. 9.

Process flow 1000 begins with 1002, and moves to operation 1004.

Operation 1004 depicts processing, by respective data processing units of the system, respective autoregressive integrated moving average models for respective sub-logical unit numbers of a storage array with first data, to generate respective temperature scores that indicate respective frequencies of access of the respective sub-logical unit numbers, wherein the first data is indicative of input/output events for the storage array. In some examples, operation 1004 can be implemented in a similar manner as operation 810 of FIG. 8.

In some examples, operation 1004 comprises capturing, by the processor, the input/output events for the storage array.

In some examples, operation 1004 comprises downsampling, by the processor, the input/output events to produce downsampled input/output events, and wherein the processing of the respective autoregressive integrated moving average models is performed based on the downsampled input/output events. That is, a CPU can collect I/O events, downsample them to create a data series, and then offload the downsampled data series to DPUs.

In some examples, respective input parameters to the respective autoregressive integrated moving average models indicate an order of an auto-regressive model. The order of the auto-regressive model can be p for an ARIMA model.

In some examples, respective input parameters to the respective autoregressive integrated moving average models indicate a degree of differencing to make a time series. The degree of differencing can be d for an ARIMA model.

In some examples, respective input parameters to the respective autoregressive integrated moving average models indicate an order of a moving average model. The order of a moving average model can be q for an ARIMA model.

In some examples, the same values for p, d, and q can be used for each ARIMA model (for each sublun).

After operation 1004, process flow 1000 moves to operation 1006.

Operation 1006 depicts determining, by the processor, respective classifications for the respective sub-logical unit numbers based on the respective temperature scores. In some examples, operation 1006 can be implemented in a similar manner as operation 812 of FIG. 8.

After operation 1006, process flow 1000 moves to operation 1008.

Operation 1008 depicts compressing, by the system, second data stored in at least some of the respective sub-logical unit numbers based on the respective classifications. In some examples, operation 1008 can be implemented in a similar manner as operation 814 of FIG. 8.

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of storage array 102 and/or remote computer 106 of FIG. 1.

In some examples, computing environment 1100 can implement one or more embodiments of the process flows of FIGS. 8-10 to facilitate offloading machine learning capabilities.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one central processing unit; and
   at least one memory that stores executable instructions that, when executed by the at least one central processing unit, facilitate performance of operations, comprising:
      maintaining a group of data processing units;
      maintaining a storage array that comprises a group of sub-logical unit numbers of storage;
      collecting, by the at least one central processing unit, first data indicative of input events for the storage array and output events for the storage array;
      processing, by respective data processing units of the group of data processing units, respective autoregressive integrated moving average models for respective sub-logical unit numbers of the group of sub-logical unit numbers with the first data, to generate respective statuses that indicate respective frequencies of access of the respective sub-logical unit numbers;
      generating, by the at least one central processing unit, a skew distribution of the respective statuses;
      determining, by the at least one central processing unit, respective classifications for respective sub-logical unit numbers of the group of sub-logical unit numbers of storage based on the skew distribution; and
      compressing, by a compression engine, second data stored in at least some of the respective sub-logical unit numbers based on the respective classifications.

2. The system of claim 1, wherein a sub-logical unit number of the group of sub-logical unit numbers identifies a sub-portion of data storage of a physical storage device.

3. The system of claim 1, wherein the at least one central processing unit is a first central processing unit, and wherein the respective data processing units comprise respective second central processing units, respective network interfaces, and respective accelerator engines that are configured to facilitate processing an autoregressive integrated moving average model.

4. The system of claim 1, wherein an autoregressive integrated moving average model of the respective autoregressive integrated moving average models is configured to determine a prediction of a future rate of data accesses for a sub-logical unit number of the group of sub-logical unit numbers based on time-series data of prior accesses of the sub-logical unit number.

5. The system of claim 1, wherein compressing the second data stored in at least some of the respective sub-logical unit numbers based on the respective classifications comprises:
in response to performing a first write operation on a first sub-logical unit number of the respective sub-logical unit numbers,
in response to a first classification of the respective classifications that corresponds to the first sub-logical unit number indicating compressing data, compressing data stored in the first sub-logical unit number, and
in response to a first classification of the respective classifications that corresponds to the first sub-logical unit number indicating not compressing data, refraining from compressing the data stored in the first sub-logical unit number.

6. The system of claim 1, wherein the operations further comprise:
downsampling, by the at least one central processing unit, the input events for the storage array and the output events for the storage array to produce downsampled input events and downsampled output events, and wherein the processing of the respective autoregressive integrated moving average models is performed based on the downsampled input events and the downsampled output events.

7. The system of claim 1, wherein the operations further comprise:
after determining the respective classifications, storing the respective classifications in a data store to produce stored respective classifications, and wherein the compression engine compresses the second data stored in at least some of the respective sub-logical unit numbers based on the stored respective classifications.

8. A method, comprising:
collecting, by at least one processor of a system, first data indicative of input and output events for a storage array;
processing, by respective data processing units of the system, respective autoregressive integrated moving average models for respective sub-logical unit numbers the storage array with the first data, to generate respective temperature scores that indicate respective frequencies of access of the respective sub-logical unit numbers;
generating, by the at least one processor, a skew distribution of the respective temperature scores;
determining, by the at least one processor, respective classifications for the respective sub-logical unit numbers based on the skew distribution; and
compressing, by the system, second data stored in at least some of the respective sub-logical unit numbers based on the respective classifications.

9. The method of claim 8, wherein the compressing is performed by a compression engine that is separate from the at least one processor and the respective data processing units.

10. The method of claim 8, wherein the respective classifications comprise respective binary values.

11. The method of claim 8, further comprising:
normalizing, by the system, the respective temperature scores to produce respective normalized temperature scores,
wherein determining the respective classifications is performed based on the respective normalized temperature scores.

12. The method of claim 11, wherein normalizing the respective temperature scores is performed based on a maximum value of the respective temperature scores and a minimum value of the respective temperature scores.

13. The method of claim 8, further comprising:
after the respective data processing units determine the respective statuses, storing the respective statuses in a database to produce stored respective statuses,
wherein compressing the second data stored in at least some of the respective sub-logical unit numbers is performed based on the stored respective statuses.

14. A non-transitory computer-readable medium comprising instructions that, in response to execution, cause a system comprising at least one processor to perform operations, comprising:
processing, by respective data processing units of the system, respective autoregressive integrated moving average models for respective sub-logical unit numbers of a storage array with first data, to generate respective temperature scores that indicate respective frequencies of access of the respective sub-logical unit numbers, wherein the first data is indicative of input/output events for the storage array;
generating, by the at least one processor, a skew distribution of the respective temperature scores;
determining, by the at least one processor, respective classifications for the respective sub-logical unit numbers based on the skew distribution; and
compressing, by the system, second data stored in at least some of the respective sub-logical unit numbers based on the respective classifications.

15. The non-transitory computer-readable medium of claim 14, wherein the operations further comprise:
capturing, by the at least one processor, the input/output events for the storage array.

16. The non-transitory computer-readable medium of claim 15, wherein the operations further comprise:
downsampling, by the at least one processor, the input/output events to produce downsampled input/output events, and wherein the processing of the respective autoregressive integrated moving average models is performed based on the downsampled input/output events.

17. The non-transitory computer-readable medium of claim 14, wherein respective input parameters to the respective autoregressive integrated moving average models indicate an order of an auto-regressive model.

18. The non-transitory computer-readable medium of claim 14, wherein respective input parameters to the respective autoregressive integrated moving average models indicate a degree of differencing to make a time series.

19. The non-transitory computer-readable medium of claim 14, wherein respective input parameters to the respective autoregressive integrated moving average models indicate an order of a moving average model.

20. The non-transitory computer-readable medium of claim 14, wherein the at least one processor is a first central processing unit, and wherein the respective data processing units comprise respective second central processing units, respective network interfaces, and respective accelerator engines that are configured to facilitate processing an autoregressive integrated moving average model.

* * * * *